Patented Jan. 30, 1934

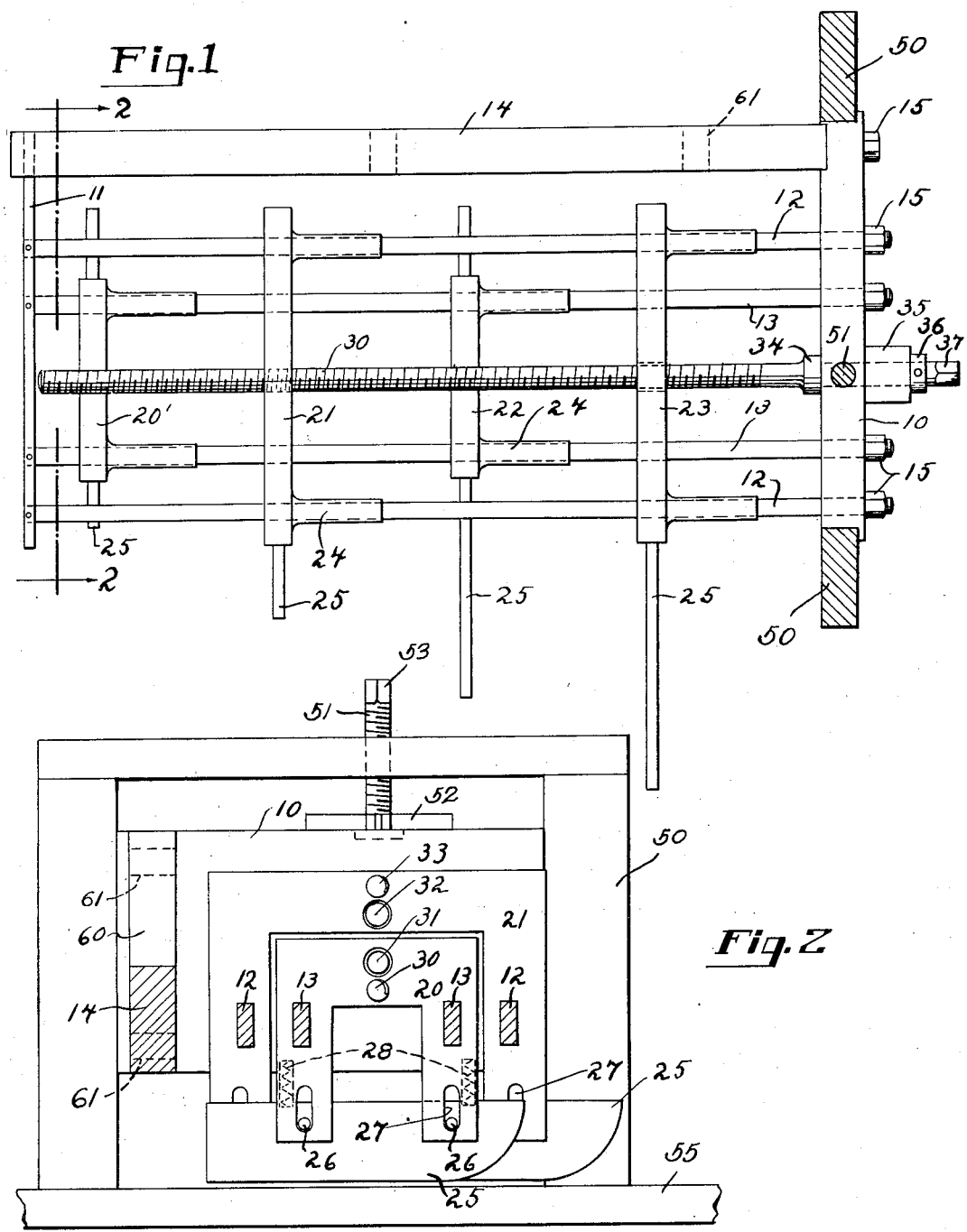

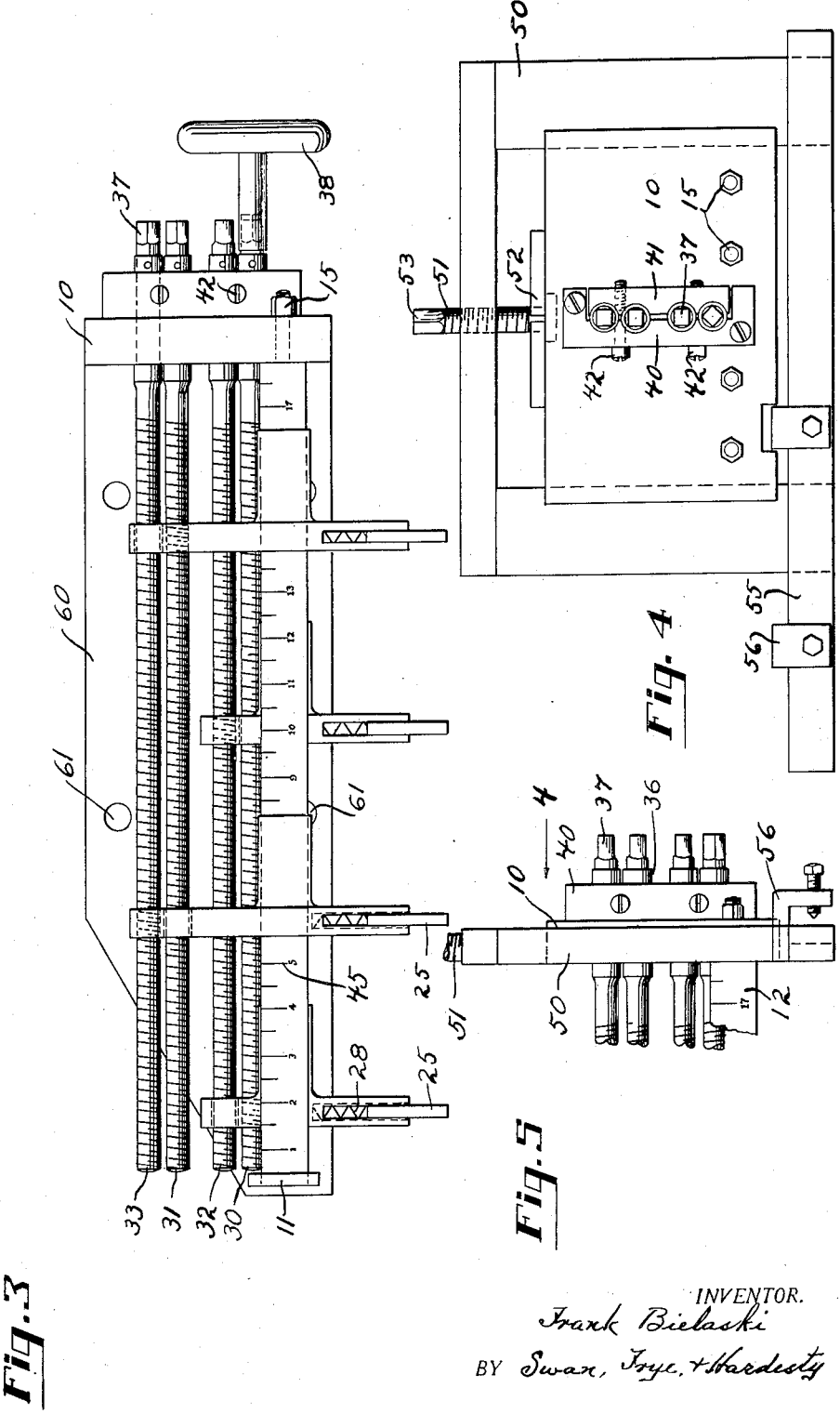

1,944,918

UNITED STATES PATENT OFFICE 1,944,918

SAW TABLE GAUGE

Frank Bielaski, Detroit, Mich.

Application February 29, 1932. Serial No. 595,714

4 Claims. (Cl. 143—168)

The present invention relates to saw table guides and among the objects of the invention is a device of this kind which is susceptible of being used as a unit attachable to existing table saws or to be mounted upon the overhead structures of that type of saw in which the saw itself is suspended above the table.

Another object of the invention is a guide which permits ready adjustment to enable accurate sawing of strips of different widths at a single setting.

Another object is to provide for increased efficiency of operation while at the same time increasing the simplicity and economy of construction.

Other objects will readily occur to those skilled in the art upon reference to the following description and the accompanying drawings in which Fig. 1 is a top plan view of the preferred form of the device.

Fig. 2 is a view in section along line 2—2 of Fig. 1.

Fig. 3 is a side elevation of the device.

Fig. 4 is an end elevation showing an additional element providing for table mounting and Fig. 5 is a fragmentary side elevation showing the table mounting elements.

As indicated in the drawings, the device embodying the invention comprises two end plates 10 and 11 secured together by a plurality of longitudinal, preferably rectangular, bars 12 and 13 and a more rigid frame member 14. It is preferred to fix permanently to plate 11 the bars 12, 13 and 14 and to removably fix the latter to plate 10 as by suitable threaded extensions and nuts 15.

Carried on bars 12 and 13 are plurality of lumber guiding and limiting members, shown as four in the present embodiment, though a greater or less number obviously may be used. These members are numbered 20, 21, 22 and 23, respectively, and as shown, alternate members only are carried on the same bars, members 20 and 22 being carried on bars 13 while members 21 and 23 are on bars 12. This arrangement is to enable the use of the laterally extending sleeves 24 which provide extended bearings for the members 20 to 23 and thereby not only make for longer life but increase the accuracy in providing greater rigidity.

The guiding members 20 to 23 are, as shown in Fig. 2, of inverted U-form with the bars 12, 13 passing through the legs thereof, the leg extremities being forked or slotted to receive one of the blades 25 which preferably are of increasing length as shown from member 20 to member 23.

These blades 25 carry pins 26 extending through suitable slots 27 in the legs and are held downward resiliently by suitable springs 28.

The means for adjustment of the guide members 20 to 23 consists of screw threaded rods 30, 31, 32 and 33 which are rotatably mounted in the plate 10, being each provided with a shoulder 34 and a smooth cylindrical portion passing through the bearing element 35 and maintained therein each by a collar 36 fixed thereon. Each rod at its outer end is provided with a polygonal portion 37 whereby it may be rotated, using a suitable wrench 38 or crank if desired.

As shown best in Fig. 4, the bearing element 35 may be separate from but secured to plate 10. It is shown as consisting of a half-bearing portion 40 screwed to plate 10 and a second half-bearing portion 41 fixed to the first as by screws 42. The portions 40—41 are slightly spaced one from another, as shown in Fig. 4, so that by tightening the clamping screws 42, the worm shafts 30, 31, 32 and 33 may be locked in position, whereas when screws 42 are sufficiently loosened, the worm shafts are free to turn.

Each of the rods 30 to 33 is threaded in one of the guide members 20 to 23 and passes freely through the others so that rotation of the particular rod causes movement of the guide member longitudinally on its supporting bars 12 or 13, at least one of the latter preferably being graduated in suitable inch or other marks, as shown at 45.

The raising and lowering of the device to accommodate different lumber thicknesses is provided for by mounting the plate 10 in a guide frame 50 having slides formed at the sides thereof and having a top piece in which is threaded a bolt 51, having a head rotatably mounted in the upper part of plate 10 as shown at 52, and which has a polygonal end as at 53 for coaction with the wrench 38.

As indicated above, the device is adapted for mounting either upon a saw table or upon the saw suspending support in those saws in which the saw does not project up through the table but is carried on an overhead support.

For mounting on the saw table the frame 50 may be provided with suitable clamps, for example, the bar member 55 may be fixed to or form a part of the frame and provided with clamps 56 adapted to be secured to the flange with which such tables are usually provided.

For attachment to the overhead saw support a plate 60 may be secured to or form a part of the bar 14 and may be provided with a bolt or screw holes 61, through which it may be bolted to said support. In this case, the frame 50 and its parts may be omitted as the raising and lowering of the guide members will be accomplished by and with the supporting means.

In the use of the device it is intended to be mounted adjacent a saw with the latter parallel with and close to the outer side of plate 11 and the first of the graduations 45 accurately located at the proper distance from the saw. This being done, it is obvious that strips of a desired width may easily and repeatedly be cut. Further, if strips of two or more widths are desired, two or more of the guide members 20—23 may be set and on account of the yielding mounting of blades 25, the intermediate ones ride up on the lumber and do not interfere.

Now having described the invention and the preferred embodiment thereof, it is to be understood that the said invention is to be limited, not to the specific details herein set forth, but only by the scope of the claims which follow:

What I claim is:

1. A sawing gauge comprising a frame including longitudinally arranged slide bars, a plurality of slidably mounted supporting members having laterally extending bearing portions engaging said slide bars, alternate ones of which bearing portions being carried by different ones of said slide bars to permit their partial interfitting, a limiting member carried by each supporting member and projecting yieldably downwardly therefrom, and means for sliding said supporting members independently to enable fixing them and their supported limiting members in predetermined positions.

2. A saw gauge comprising a frame adapted to be fixed adjacent to a saw, a plurality of longitudinally arranged slideways carried by the frame, slide members carried by said slideways and having laterally extending bearing portions engaging the same, the bearing portions of alternate slides being mounted in different ways to permit interfitting of the bearing portions, limiting members carried by the slide members and projecting yieldably downwardly therefrom, and means comprising a plurality of screws for moving said slide members.

3. A saw gauge comprising a frame adapted to be fixed adjacent to a saw, a plurality of longitudinally arranged slideways carried by the frame, slide members carried by said slideways, alternate slides being carried by different ways, a limiting member carried by each slide, projecting yieldably downwardly therefrom and movable therewith toward and away from said saw, separate rotatable threaded shafts passing thru and threaded in each of said slide members and fixed against longitudinal movement, means for rotating said shafts, and means for locking the same against rotation, including a clamping block engaging all of said shafts, and screw means for tightening the block against the shafts.

4. A saw gauge comprising a frame adapted to be fixed adjacent to a saw, a plurality of limiting members mounted on said frame and movable toward and away from said saw, separate screw shafts cooperating with each of said members to move it longitudinally, a plurally sectioned bearing block supporting one end of each of said shafts, means for moving the block vertically to raise and lower said frame members as a unit, and means for tightening one of said block sections against the screw shafts to clamp the latter against turning.

FRANK BIELASKI.